(12) United States Patent
Tofinetti et al.

(10) Patent No.: US 8,793,585 B2
(45) Date of Patent: Jul. 29, 2014

(54) COMMUNICATION SYSTEM MANAGEMENT APPARATUS, METHODS, AND INTERFACES

(75) Inventors: Michael Nicholas Tofinetti, Kanata (CA); Karen Ensing, Carp (CA); Paul Kuruvilla, Kanata (CA); Saied Heidari, Ottawa (CA); Frances Jean Hardwick, Ottawa (CA); David Kiesekamp, Merrickville (CA); Terrence Martineau, Ottawa (CA); Robert Craig, Ottawa (CA); Sasa Nijemcevic, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1618 days.

(21) Appl. No.: 11/347,883

(22) Filed: Feb. 6, 2006

(65) Prior Publication Data

US 2007/0185874 A1 Aug. 9, 2007

(51) Int. Cl.
*G06F 15/177* (2006.01)
(52) U.S. Cl.
USPC ............ 715/734; 715/733; 715/735; 715/736
(58) Field of Classification Search
USPC ........................................... 715/734, 73, 735
See application file for complete search history.

(56) References Cited

U.S. PATENT DOCUMENTS 6,724,403 B1 * 4/2004 Santoro et al. ................ 715/765
2005/0240874 A1 10/2005 Kiesekamp et al.

OTHER PUBLICATIONS

Ken Slovak, "Absolute Beginner's Guide to Microsoft Office Outlook 2003," Oct. 1, 2003, Que.*

* cited by examiner

*Primary Examiner* — Robert Stevens
*Assistant Examiner* — Daniel Um
(74) *Attorney, Agent, or Firm* — Eckert Seamans Cherin & Mellott, LLC (57) ABSTRACT

Communication system management apparatus, methods, and interfaces are disclosed. A group of objects that are associated with different types of communication system components in a representation of a communication system are configured in a group. A further representation of the objects of the group is provided, and includes an indication of component operational status for one or more communication system components respectively associated with one or more of the objects of the group. The further representation of the objects of the group may also or instead provide access to the objects of the group, so that information associated with the objects may be more easily displayed, for example. The communication system representation and the group representation are provided in a Graphical User Interface (GUI) in some embodiments.

12 Claims, 3 Drawing Sheets

COMMUNICATION SYSTEM MANAGEMENT APPARATUS, METHODS, AND INTERFACES

FIELD OF THE INVENTION

This invention relates generally to communication systems and, in particular, to communication system management.

BACKGROUND

Electronic tools for managing communication systems such as hierarchical telecommunication networks typically provide a network management map display. The map display allows operators or other personnel to "drill down" through layers of network maps so as to locate and manage network objects, which are associated with actual communication system components. Network object hierarchies can contain tens of thousands of network objects, representing such components as network elements, groups of network elements, line cards, and ports for instance. Each time that an operator wishes to view information for a particular network object, the operator must navigate back and forth through several layers of the map to reach the correct view of the network object, which can be time consuming. This becomes burdensome as the size of a communication system or hierarchy being managed grows.

An operator can leave a window displaying a desired network object open, and possibly minimized, while investigating a different network object. This allows the operator to return to a particular network object frequently by merely returning to the window containing the view of the network object. However, this can result in so many open windows or minimized icons being displayed simultaneously that the operator may have difficulty locating the window appropriate to the desired network object. Additionally, leaving windows open is only useful for as long as a current session is active, since all windows are normally closed when an operator ends a network management session, that is, logs out.

Status monitoring can present similar challenges for an operator. Operational status for a network object is normally displayed when a window for a particular object is opened by selecting the object in a network map display, rather than in the network map display itself. Operational status of an object may or may not be indicated on a network map, depending on the layer of the map that the operator is currently viewing. An operator may leave open multiple windows so that they can view any change in the status of the objects contained in the windows. As noted above, multiple windows can make window management difficult for the operator, and the opening of each window is a task that must be repeated for each user session.

Although it may be possible to list operational status information for more than one object in one window, this type of window typically lists information for only one object type, and accordingly an operator may require multiple windows to monitor status information for more than one type of object. Object listings also provide a static view of information at the time a list is generated. Repeatedly listing object types to obtain current information can be very time consuming.

Co-pending U.S. patent application Ser. No. 10/829,252, entitled "BOOKMARKS USED FOR MAP NAVIGATION", filed on Apr. 22, 2004, published on Oct. 27, 2005 with Publication No. 2005/0240874, and assigned to the Assignee of the present application, discloses bookmarks for a network management tool or other application used to manage or view network objects in a network object hierarchy.

The invention disclosed in the co-pending application allows an operator to more easily navigate to frequently used network objects so that windows for such objects need not be kept open or minimized. The bookmarks themselves, however, do not provide a substantial amount of information associated with the bookmarked objects.

Thus, there remains a need for communication system management techniques that provide improved access to relevant information such as operational status information and/or other information.

SUMMARY OF THE INVENTION

Some embodiments of the present invention address the problem of monitoring the operational status of specific objects in a Network Management (NM) Graphical User Interface (GUI). Operator efficiency in repeatedly locating and accessing specific objects may also be improved.

According to an aspect of the invention, there is provided an apparatus comprising an object group manager and an object monitor. The object group manager is operable to allow configuration of a group of objects that are associated with different types of communication system components in a representation of a communication system, and to provide in a further representation of the objects of the group an indication of component operational status for one or more communication system components respectively associated with one or more of the objects of the group. The object monitor is operatively coupled to the object group manager and operable to determine the component operational status for the one or more communication system components respectively associated with the one or more objects, and to provide the component operational status to the object group manager.

At least one of the object group manager and the object monitor may be implemented in software for execution by a processor.

The apparatus may also include a memory, in which case the object group manager may be further operable to store respective identifiers of the objects of the group in the memory, and the object monitor may be further operable to determine the one or more objects for which component operational status is to be determined by accessing the identifiers stored in the memory.

In some embodiments, the object group manager is further operable to receive user inputs for configuring the group of objects. The user inputs may include one or more of: an add object input to add an object to the group, and a remove object input to remove an object from the group.

The object monitor may be operable to detect a change in component operational status for a communication system component associated with an object and to provide an updated component operational status for the communication system component associated with the object to the object group manager responsive to detecting a change. The object group manager then provides an indication of the updated component operational status information in the further representation.

The object monitor may determine additional information for one or more of the objects of the group and provide the additional information to the object group manager, which provides an indication of the additional information in the further representation.

In some embodiments, the object group manager receives user inputs specifying types of information for which an indication is to be provided in the further representation.

The representation may include a representation of information stored in a database. In this case, the object monitor may access the database to determine the component operational status for the communication system components respectively associated with the one or more objects.

Either or both of the representation and the further representation may be provided in a GUI.

The further representation may include one or more graphical elements through which an object function for an object of the group are accessible, the object functions comprising one or more of: a function to display all available information associated with an object, a function to configure for an object an action to be performed responsive to a particular component operational status, and one or more contextual menu functions.

Another aspect of the invention provides a method, which involves identifying objects of a group of objects that are associated with different types of communication system components in a representation of a communication system, determining a component operational status for one or more communication system components respectively associated with one or more of the identified objects, and displaying in a further representation of the objects of the group an indication of component operational status for the one or more communication system components respectively associated with the one or more of the identified objects.

The method may also include an operation of receiving user inputs for configuring the group of objects, the user inputs comprising one or more of: an add object input to add an object to the group, and a remove object input to remove an object from the group.

Operations of determining whether the component operational status for a communication system component associated with an object has changed, and updating the component operational status indication for the object in the further representation where the component operational status has changed, may also be performed.

In some embodiments, the operation of displaying involves displaying the further representation in a GUI.

According to another aspect of the invention, an apparatus includes an object group manager operable to allow configuration of a group of objects from a graphical representation of a communication system, and to provide in a further graphical representation of the objects of the group an indication of operational status associated with one or more objects of the group and one or more graphical elements for accessing respective objects of the group, and an object monitor operatively coupled to the object group manager and operable to determine the operational status associated with the one or more objects, and to provide the operational status to the object group manager.

A GUI, in accordance with a further aspect of the invention, includes a representation of a group of objects that would be associated with different types of communication system components in a representation of a communication system. The group representation includes an indication of a component operational status for one or more components respectively associated with one or more of the objects of the group.

The group representation may include a respective icon representing each object of the group. The icon representing an object provides access to object information associated with the object.

A color of an icon representing an object may provide the indication of component operational status for the component associated with the object.

A still further aspect of the invention provides a machine-readable medium storing a data structure. The data structure includes a plurality of object identifiers identifying objects associated with different types of communication system components in a representation of a communication system, an indication that the objects identified by the plurality of object identifiers comprise a group of objects, and an indication that operational status information for one or more components respectively associated with one or more of the objects of the group is to be included in a representation of the group of objects.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
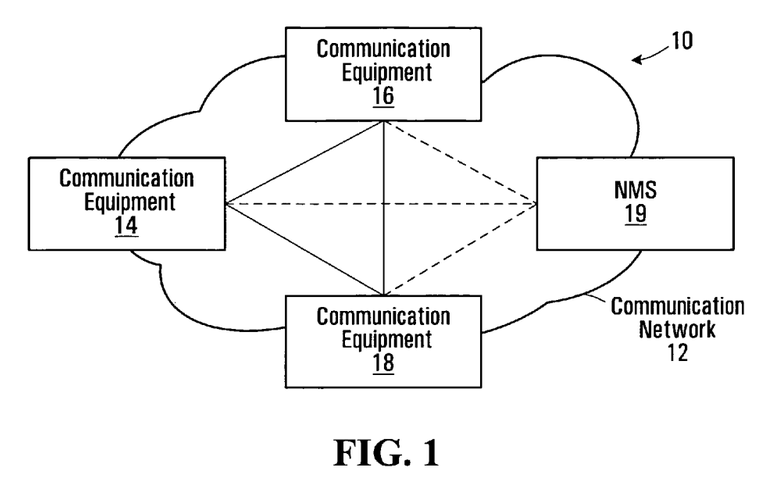
FIG. 1 is a block diagram of a communication system.

FIG. 1 is a block diagram of a communication system 10. The communication system 10 includes a communication network 12, communication equipment 14, 16, 18, and an NMS 19.

Although a communication system may include multiple communication networks, each having respective communication equipment and possibly an NMS, only one communication network 12 and one NMS 19 have been shown in FIG. 1 to avoid overly complicating the drawing. A communication network may also have more or fewer than three installations of communication equipment 14, 16, 18. In addition, other equipment may be provided within a communication network or operate in conjunction with a communication network, such as end user equipment and other user, management, or control equipment.

It should therefore be appreciated that the communication system 10 of FIG. 1, as well as the contents of the other drawings, are intended solely for illustrative purposes, and that the present invention is in no way limited to the particular example embodiments explicitly shown in the drawings and described herein.

The communication network 12 includes equipment 14, 16, 18 through which communications may be established. The equipment 14, 16, 18 in the communication network 12 may be operatively coupled together through any of various types of connections over which communication signals can be exchanged. Connections may include wired connections, wireless connections, or some combination thereof. Communications over these connections may be established, for example, for telephone calls and data communication sessions.

The particular types of connections and communication signal exchange available in the communication network 12 are at least to some extent dependent upon the type of the equipment 14, 16, 18 used to implement the network, the protocols used in the network, the services offered by service providers using the network, the type of end user equipment for which the connections are established, for instance, and/or possibly other factors.

The communication equipment 14, 16, 18, may include network elements such as switches or routers, or other types of communication equipment. Those skilled in the art will be familiar with these and many other examples of communication equipment.

Figure 2:
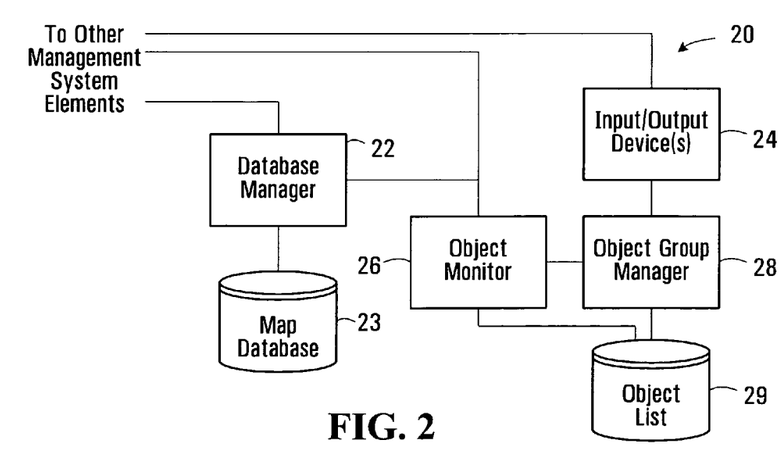
FIG. 2 is a block diagram of an apparatus implementing an embodiment of the invention.

Control and management functions, which may include connection setup, management, and release, failure protection, and network monitoring, for example, are provided by the NMS 19. The NMS 19 is operatively coupled to the equipment 14, 16, 18 and exchanges at least control information with these components. Control paths between the NMS 19 and the equipment 14, 16, 18 may share the same network connections as data paths between the equipment 14, 16, 18, although separate, dedicated control connections may also or instead be used. An illustrative example of an apparatus that may be provided in an NMS 19 is shown in FIG. 2 and described below.

The operation of many different types of communication system will be apparent to those skilled in the art. As the present invention relates primarily to management functions, actual communication functions in a communication system are described in detail herein only to the extent necessary to illustrate features of embodiments of the invention.

The NMS 19 may provide a management tool through which an operator or other personnel can perform various management functions for the communication system 10. As noted above, a management tool is often implemented in software that displays a representation of a managed communication system as a network map that includes objects associated with components of a communication system.

According to one particular embodiment of the invention, the concept of an "object well" for a management tool is introduced. The object well may be a stand-alone window, for example, which acts as a repository for a group of objects selected by an operator. Objects in such a group may be displayed not only in a network map, but also in the object well for quick and easy access. The object well may thus provide a further representation of objects that have been configured as part of a group. Pertinent object information such as object type, operational status, and object specification may also be shown in an object well.

An object well may thereby enable operators to easily monitor the operational status of multiple objects, or strictly the communication system components with which the objects are associated. For example, an operator might add objects associated with specific communication links in an object well, and then leave the object well open on their screen to monitor the status of the links. In some embodiments, indications of operational status displayed in an object well are dynamically updated to further improve status monitoring capabilities.

Operators may also access frequently required objects more quickly and easily using an object well instead of a network map, tree view, or other representation of a communication system. Frequently used objects may be added to an object well so that they can be more easily accessed without listing or drilling down through an object hierarchy in a network map. Although a management tool may generate and display both an object well and a network map or tree in an NM GUI, the well and the map or tree need not necessarily be displayed on a screen at the same time. An operator might maximize an object well window, for example, in which case the network map or tree might no longer be visible.

It should be appreciated that objects in a representation of a communication system, whether or not those objects are also separately displayed as part of a group of objects, may be associated with any of various types of communication system components. An object may represent physical communication equipment 14, 16, 18 (FIG. 1), such as a network element or node, a constituent physical component of communication equipment, such as a rack, shelf, line card, or port, or a physical connection, for example. However, other types of components may also or instead be associated with objects. It may be useful, for example, to have objects associated with logical connections that are established over physical conductors in the network. References herein to objects and associated communication system components should be interpreted accordingly.

FIG. 2 is a block diagram of an apparatus implementing an embodiment of the invention. The apparatus 20 may be provided, for example, at an NMS and/or some other central or distributed management system or terminal.

As shown, the apparatus 20 includes a database manager 22, a map database 23 operatively coupled to the database manager 22, an object monitor 26 operatively coupled to the database manager 22, an object group manager 28 operatively coupled to the object monitor 26 and to the database manager 22, one or more input/output devices 24 operatively coupled to the object group manager 28, and an object list 29 operatively coupled to the object monitor 26 and to the object group manager 28.

A system or device incorporating the apparatus 20 may include additional elements, illustratively elements that provide a system map and other communication system management functions. It should also be appreciated that the specific division of functions represented by the elements 22, 24, 26, 28 is intended solely for the purposes of illustration and not to limit the scope of the invention. Other embodiments of the invention may include further, fewer, or additional elements interconnected in a similar or different manner.

The elements of the apparatus 20 may be operatively coupled to each other through physical connections or through logical interconnections where any of the elements are implemented using software for execution by one or more processing elements. For software-based implementations, different elements may access data stored in common storage locations in a memory, for example, and may thus be considered to be coupled to each other through a logical connection.

From the foregoing, it will be apparent that many of the elements of the apparatus 20 may be implemented using hardware, software, firmware, or any combination thereof. Those skilled in the art will be familiar with many devices that may be used in implementing the apparatus 20, including microprocessors, microcontrollers, Application Specific Integrated Circuits (ASICs), Programmable Logic Devices (PLDs), and/or Field Programmable Gate Arrays (FPGAs), for example.

In view of the many possible implementations of the components shown in FIG. 2, these components are described herein primarily in terms of their function. Based on these functional descriptions, a skilled person would be enabled to implement embodiments of the invention in any of various ways.

The map database 23 and the object list 29, however, would generally be provided as data stores in a hardware component, specifically one or more memory devices. Solid state memory devices are common in communication equipment, although the apparatus 20 may also or instead include memory devices for use with movable or even removable memory media. According to one embodiment, the object list 29 is stored in a memory area associated with an operator's user account. This way, operators have access to their object group(s) whenever they log onto a management system.

The input/output devices 24 will also generally include physical devices such as a keyboard, a mouse, and a display. A touchscreen is one example of a device which can both receive inputs from a user and provide outputs to a user.

In operation, the database manager 22 provides an interface to the map database 23, in which information associated with various objects in a representation of a managed communication system are stored. The database manager 22 receives control information from the managed communication network and updates the map database 23 so as to keep the map database 23 current. The map database 23 may be updated by the database manager 22 responsive to network events, such as the addition or configuration of new communication system components, operational status changes, etc.

As described in further detail below, the database manager 22 may also advise other elements of network events. This provides one mechanism whereby the object monitor 26 can supply dynamically updated object information to the object group manager 28 for any or all objects in a group.

The object group manager 28 is operable to allow an operator to configure a group of objects for which the enhanced information and/or access features disclosed herein are to be provided. Although the objects in a group would usually be part of one communication system representation, illustratively a network map, the objects in a group are also included in a further group representation. For example, a network management GUI implementing an embodiment of the invention may include both a network map display through which objects associated with all managed components would be displayed and accessible, and an object well window in which objects that have been configured as part of a group are also displayed and accessible.

The object group manager 28 may allow an operator to include in the same group objects that are associated with different types of communication system components. The operator is then able to include node, card, port, and link objects, for example, in the same group. The object group manager 28 may also be operable to include in a representation of the objects of a group an indication of component operational status for communication system components associated with one or more of the group's objects. This can substantially simplify operational status monitoring over traditional listing techniques, in that status information for different types of objects can be provided in a single group representation, such as one window.

Access to other object information and functions may also be provided by the object group manager 28. The group representation may include one or more graphical elements, illustratively icons, for accessing the objects of the group. In some embodiments, the group representation is a table, and an operator may select an object in the table by clicking anywhere on a line in the table, and not just on an object's icon. An operator might select an object to open a window displaying all available information for the object, for example.

The object monitor 26 may determine any of various types of information for any or all of the objects of a group. In the apparatus 20, the object monitor 26 obtains object information from the database manager 22, although in other embodiments, the object monitor 26 interacts directly with the map database 23. Dynamic updating of object information for objects in a group is also contemplated. To this end, the object monitor 26 may register with the database manager 22 so that it is advised of network events affecting objects in a group. The object monitor 26 may thus have an active role in determining object information, where object information is requested from the database manager 22, or a more passive role, where the database manager 22 advises the object monitor 26 of relevant network events.

Object information determined by the object monitor 26 is passed to the object group manager 28, which provides an indication of the object information, and updated object information in the case of dynamic updates, in the group representation.

In the context of configuring an object group, the object group manager 28 receives user inputs from one or more of the input devices 24. An "add object" input might be provided by a user by selecting a particular object in a network map and then invoking an add object function. This function could be invoked using a mouse, for example, by right clicking on an object in the network map and selecting the function from a popup menu, selecting an object in the network map and then selecting an "add object" or analogous button in a group display window, or by dragging an object from the network map into the group display window. Other selection and adding mechanisms may be or become apparent to those skilled in the art. The present invention is in no way restricted to any particular group configuration mechanism.

When an object is added to a group, the object group manager 28 stores at least an identifier of that object in the object list 29. This identifier preferably references a data record in the map database 23 corresponding to the object, so that any object changes that are made by an operator using the group representation are also reflected in the map database 23. Object changes may be propagated to the map database 23 by the object group manager 28 or the object monitor 26, and may be treated by the database manager 22 in the same way as changes made through another part of a management tool or GUI.

Using one set of database records for both a network map and an object group ensures that the network map and the object group have the same view of a managed communication system. If separate databases are maintained for the network map and any object groups, some sort of synchronization mechanism could also be provided, by the object monitor 26 or the object group manager 28, to propagate changes between the databases.

Whether one database or multiple databases are used, objects added to an object group may also remain in a network map. Thus, in some embodiments, objects are effectively copied to an object group in the sense that these objects are part of both the main network map and the object group.

An operator might also wish to remove an object from an object group. This function could be implemented in a similar manner as the add object function described above, through a popup menu, button, drag function, or some other mechanism. Information for an object is removed from the object list 29 by the object group manager 28 when that object is removed from the object group.

The object list 29 is accessed by the object monitor 26 to determine for which objects information is to be obtained from the map database 23. In addition to object identifiers, the object list 29 may include information specifying, for example, to which group(s) each object belongs, which type(s) of object information should be obtained for each object, and whether information for each object is to be dynamically updated.

The particular types of information provided to the object group manager 28 for inclusion in the group representation vary between objects or types of objects. In some embodiments, an operator can configure the information that is to be shown in the group representation.

Figure 3:
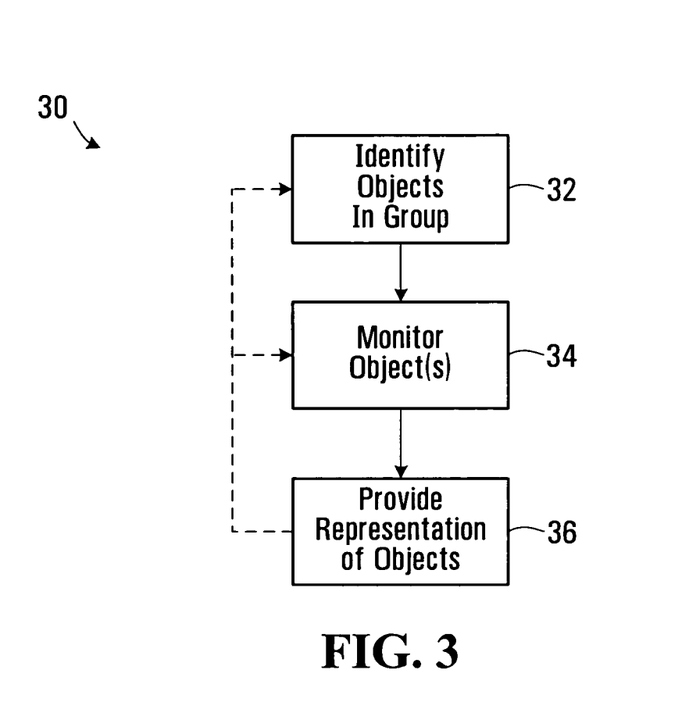
FIG. 3 is a flow diagram of a method of an embodiment of the invention.

FIG. 3 is a flow diagram of a method of an embodiment of the invention. The method 30 involves an operation 32 of identifying the objects of a group. During group configuration, this may entail receiving inputs from a user specifying objects to be added to a group. After objects have been added to group, the objects for which object information is to be obtained are identified using an object list, as described above with reference to the object monitor 26 (FIG. 2).

The monitoring operation at 34 may involve, for example, determining a component operational status for communication system components respectively associated with one or more of the identified objects. Other object information may also or instead be obtained at 34.

At 36, a group representation including the identified objects is provided, illustratively by displaying a representation of the objects of the group and an indication of component operational status for components associated with the one or more of the identified objects.

As indicated by the broken lines in FIG. 3, the operations 32, 34, 36 may be repeated. Objects in a group may be identified at 32 one at a time, and object information might then be obtained at 34 as each object is identified, for example. A representation could be updated at 36 as objects are added to or removed from a group, which could be detected at 32. In some embodiments, object information is dynamically updated, and accordingly the monitoring operation at 34 is ongoing. The group representation may be updated at 36 when changes in object information are detected at 34.

It should be appreciated that the method 30 is intended as one example of a method according to an embodiment of the invention. Other embodiments may involve further, fewer, or different operations, which may be performed in a similar or different order than explicitly shown. Some variations of the method 30 and examples of additional or different operations that may be performed have been described herein, and others may be or become apparent to those skilled in the art.

Although described above primarily in the context of an example apparatus and method, the present invention may be implemented or supported in other forms, including data structures or instructions stored on a machine-readable medium or a displayed representation in a GUI, for example. A data structure and GUI are described in further detail below with reference to FIGS. 4 and 5, respectively.

Figure 4:
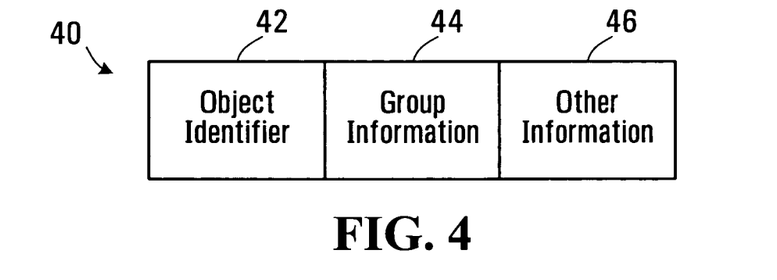
FIG. 4 is a block diagram of a data structure.

FIG. 4 is a block diagram of a data structure. The data structure 40 would be stored as part of the object list 29 (FIG. 2). A record having a format as shown in FIG. 4 might be stored for each object of a group, for example. The data structure 40 includes an object identifier 42, group information 44, and other information 46.

The object identifier 42 identifies an object that has been added to a group. The format of this identifier will generally be implementation-dependent, although in one embodiment the identifier 42 corresponds to an object identifier used in a network map database.

The group information 44 may identify a group to which the object identified at 42 belongs, which would be useful if an operator has configured multiple groups. The group information 44 might also or instead indicate the particular types of object information that are to be included for the object in the group representation and/or the types of object information, if any, that are to be dynamically updated.

As noted above, some embodiments of the invention may use separate data stores for a network map and object groups. Object information is one example of other information that may be included in the data structure 40 at 46. In some embodiments, all object information included in the data structure 40 at 46 would be included in a subsequently generated group representation. The field 46 could then itself be an indication of the particular information to be included for the object in a group representation.

A data structure used to implement object and group functions as disclosed herein may include additional fields, fewer fields, or different fields than those shown in FIG. 4. For example, in a relatively simple implementation, an operator has only one object group, and an object list includes a list of object identifiers and some sort of indication that the list relates to an object group. This group indication may be an explicit indication in the form of a group name or other identifier at 44, for example. The nature of an object list may instead be indicated implicitly, in that the existence of one or more object identifiers at a particular memory location indicates that a group of objects has been configured.

Figure 5:
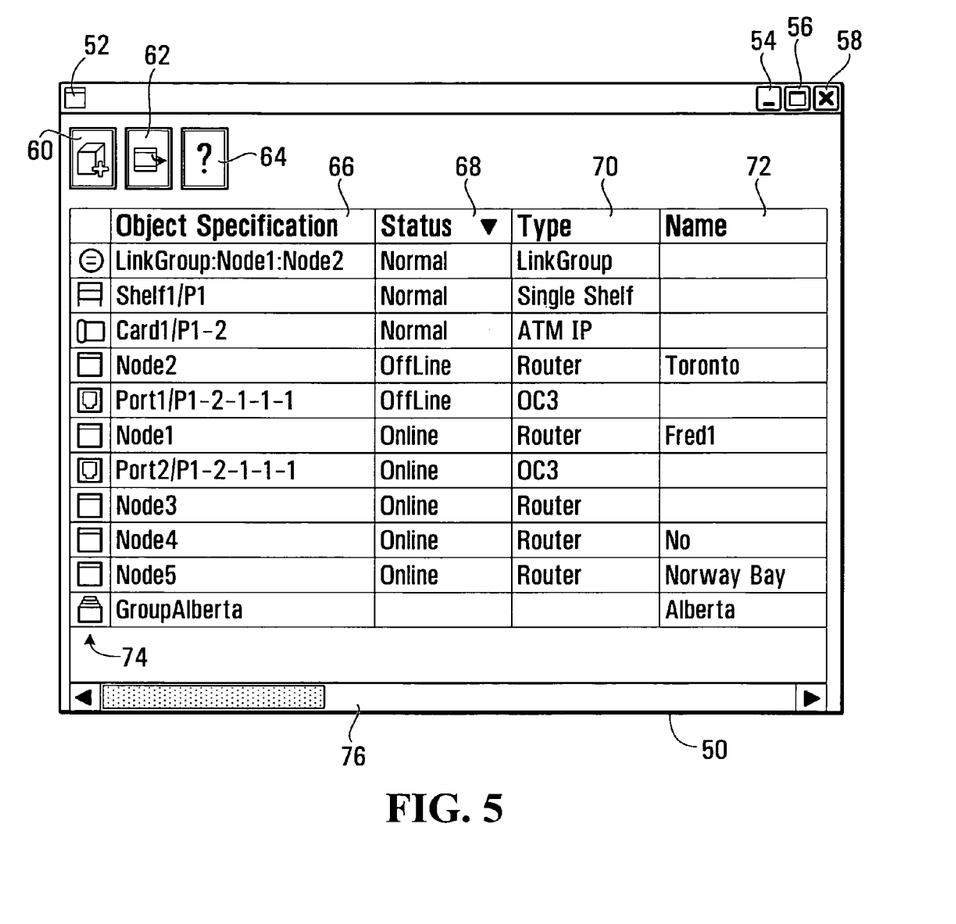
FIG. 5 is a block diagram of an example representation of a group of objects.

FIG. 5 is a block diagram of an example representation of a group of objects. In FIG. 5, the representation is in the form of a window 50, with common graphical elements such as the icon 52, minimize, maximize, and close window functional elements 54, 56, 58, and a scroll bar 76.

The window 50 also includes object/group function graphical elements. The add object button 60 allows an operator to add an object to the group corresponding to the window 50. Responsive to clicking or otherwise selecting the add button 60, an object that was previously selected, from a network map, table, tree, list, etc., for example, would be added to the group and the window 50 would be updated accordingly. The remove button 62 provides the opposite function of removing an object from the group. Other add and remove mechanisms are also possible, and some examples thereof have been described above.

As will be apparent, the help button 64 may provide access to group, object, and/or general help information.

For each object in the group, the window 50 includes an icon 74, which in some embodiments can be selected to access all available information for an object. Object information, including object specification, operational status, object type, and object name, are also displayed at 66, 68, 70, 72. Object specification is a unique identifier relating to an object that is human readable. For example, node 1, peripheral shelf 1, slot 1, port 1 could be abbreviated in an object specification as 1/P1-1-1. The other fields of object information shown in FIG. 5 are self-explanatory.

It should be appreciated that the invention is in no way limited to these particular types of information. The information to be presented in a group representation may be predefined or possibly configurable.

The window 50 illustrates several useful features of the techniques disclosed herein. For example, the window 50 shows status information for multiple objects of various types. In some embodiments, the status information displayed at 68 is dynamically updated based on actual network events. The icons 74, and/or other functional graphical elements, can also provide access to particular objects from a single location instead of requiring an operator to first locate desired objects in a generally much larger and more complicated network map or tree. The operator may wish to view other information for an object or to revise the object information, for example.

As noted above, a table such as shown in FIG. 5 may enable an operator to sort object information or rearrange the order of columns. An arrow in a column header, as shown in the status column in FIG. 5, may be used to indicate the field and direction of the sort.

In some embodiments, an operator can select an object row, instead of or as well as an object icon.

Additionally, functions to access more than just attributes of an object may also be provided. For example, when an object is selected with a single mouse-click or other single-selection mechanism, the group representation may be modified to indicate that the object has been selected, and attributes of the selected object may be displayed in a different part of a GUI, such as in a Selection Window. When an object is double-selected, configuration forms for the display of all object attributes may be opened.

Selecting an object in a different way, such as by right-clicking an icon or row, might cause a contextual menu for an object to be displayed. This may then allow users to carry out contextual operations on an object. Contextual menu functions may include, among others, any or all of a configure object function, an open object function, and a create report function.

It should also be noted that not every object of a group need necessarily have the same associated types of information. In FIG. 5, one object does not have an operational status or type. Operational status might not be applicable for this object, for example. Other objects do not have an assigned name. Therefore, a group representation may include indications of object information for any or all objects to the extent that such information is available for those objects.

Variations of the example group representation shown in FIG. 5 may include further, fewer, or different object information than shown. A variation that might not be immediately evident from FIG. 5 would be the use of display attributes such as color to provide operational status indications. An icon may be colored RED when there are faults detected, for example.

A group representation may also or instead support object functions other than or in addition to those specifically described herein. For example, an operator may wish to have a certain action performed in the event of a change in operational state associated with an object or in response to some other condition(s). An action flag or other graphical element might be displayed for each object to allow the operator to specify the action and condition(s) and/or to indicate that an action has been specified for the object.

Embodiments of the invention may thus provide greater operator efficiency when monitoring or managing frequently accessed objects. An operator can add an object to a group or object well or remove objects from the object well through the use of add and remove buttons or other mechanisms. The object well may be used to show object information such as the type of each object, its name, object specification, and its operational status. For each object in the object well, an icon for object type may also be displayed and colored, where applicable, according to the object's status. In some embodiments, attributes of objects in an object well are dynamically updated.

What has been described is merely illustrative of the application of principles of embodiments of the invention. Other arrangements and methods can be implemented by those skilled in the art without departing from the scope of the present invention.

We claim:

1. An apparatus comprising:
a display;
an object group manager operatively coupled to the display and operable to enable user selection of objects, which are associated with different types of communication equipment components in a representation of a communication system displayed on the display, for inclusion in an object group, and to provide in a further representation of the objects in the object group displayed on the display indications of component operational status for multiple communication equipment components respectively associated with multiple objects in the object group, the indications being displayed simultaneously in the further representation; and
an object monitor operatively coupled to the object group manager and operable to determine the component operational status for each of the multiple communication equipment components respectively associated with the multiple objects, and to provide each component operational status to the object group manager.

2. The apparatus of claim 1, wherein at least one of the object group manager and the object monitor is implemented in software for execution by a processor.

3. The apparatus of claim 1, further comprising:
a memory,
wherein the object group manager is further operable to store respective identifiers of the objects in the object group in the memory, and wherein the object monitor is further operable to determine the multiple objects for which component operational status is to be determined by accessing the identifiers stored in the memory.

4. The apparatus of claim 1, wherein the object group manager is further operable to receive user inputs, the user inputs comprising one or more of: an add object input to add an object to the object group, and a remove object input to remove an object from the object group.

5. The apparatus of claim 1, wherein the object monitor is further operable to detect a change in component operational status for a communication equipment component associated with an object and to provide an updated component operational status for the communication equipment component associated with the object to the object group manager responsive to detecting a change, and wherein the object group manager is further operable to provide an indication of the updated component operational status information in the further representation displayed on the display.

6. The apparatus of claim 1, wherein the object monitor is further operable to determine additional information for one or more of the objects in the object group and to provide the additional information to the object group manager, and wherein the object group manager is further operable to provide an indication of the additional information in the further representation displayed on the display.

7. The apparatus of claim 6, wherein the object group manager is further operable to receive user inputs specifying types of information for which an indication is to be provided in the further representation displayed on the display.

8. The apparatus of claim 1, wherein the representation comprises a representation of information stored in a database, and wherein the object monitor is operable to access the database to determine the component operational status for the communication equipment components respectively associated with the multiple objects.

9. The apparatus of claim 1, wherein the representation and the further representation comprise a Graphical User Interface (GUI).

10. The apparatus of claim 9, wherein the further representation comprises one or more graphical elements through which an object function for an object of the object group are accessible, the object functions comprising one or more of: a function to display on the display all available information associated with an object, a function to configure for an object an action to be performed responsive to a particular component operational status, and one or more contextual menu functions.

11. A method comprising:
identifying objects that are associated with different types of communication equipment components in a displayed representation of a communication system, and that have been selected for inclusion in an object group;

determining a component operational status for each of multiple communication equipment components respectively associated with multiple identified objects;

displaying in a further representation of the identified objects in the object group indications of component operational status for the multiple communication equipment components respectively associated with the multiple identified objects, the indications being displayed simultaneously in the further representation; and receiving user inputs, the user inputs comprising one or more of: an add object input to add an object to the object group, and a remove object input to remove an object from the object group.

12. An apparatus comprising:

a display;

an object group manager operatively coupled to the display and operable to enable user selection of objects, from a graphical representation of a communication system, for inclusion in an object group, the objects representing different types of communication equipment components, and to provide in a further graphical representation of the objects in the object group displayed on the display indications of operational status associated with multiple objects in the object group, and one or more graphical elements for accessing respective objects in the object group, the indications being displayed simultaneously in the further representation; and an object monitor operatively coupled to the object group manager and operable to determine the operational status associated with the each of the multiple objects, and to provide each operational status to the object group manager.

* * * * *